(12) United States Patent
Han

(10) Patent No.: US 7,981,537 B2
(45) Date of Patent: Jul. 19, 2011

(54) ELECTRODE ASSEMBLY AND SECONDARY BATTERY HAVING THE SAME

(75) Inventor: Wonchull Han, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 12/285,558

(22) Filed: Oct. 8, 2008

(65) Prior Publication Data

US 2009/0092898 A1 Apr. 9, 2009

(30) Foreign Application Priority Data

Oct. 8, 2007 (KR) .................. 10-2007-0101057

(51) Int. Cl.
*H01M 2/14* (2006.01)
*H01M 2/16* (2006.01)
*H01M 2/08* (2006.01)
*H01M 4/02* (2006.01)

(52) U.S. Cl. ......... 429/144; 429/129; 429/185; 429/209

(58) Field of Classification Search .................. 429/185, 429/62, 144, 251, 252, 180, 130, 142, 246, 429/232, 129, 209; 428/304.4, 317.9
See application file for complete search history.

(56) References Cited

U.S. PATENT DOCUMENTS

| | | | |
|---|---|---|---|
| 4,507,368 A * | 3/1985 | Hashimoto | 429/62 |
| 5,116,701 A * | 5/1992 | Kalisz | 429/130 |
| 5,162,172 A | 11/1992 | Kaun | |
| 6,432,586 B1 | 8/2002 | Zhang | |
| 2003/0224242 A1 | 12/2003 | Kaito et al. | |
| 2005/0221165 A1* | 10/2005 | Hennige et al. | 429/62 |
| 2006/0083991 A1* | 4/2006 | Ahn et al. | 429/232 |
| 2006/0222934 A1* | 10/2006 | Min et al. | 429/142 |

FOREIGN PATENT DOCUMENTS

| | | | |
|---|---|---|---|
| CN | 1469503 A | | 1/2004 |
| CN | 1947287 A | | 4/2007 |
| JP | 2005-285605 | | 10/2005 |
| KR | 1020040039568 A | | 5/2004 |
| KR | 1020060094765 A | | 8/2006 |
| KR | 10-2006-0124036 A | * | 12/2006 |
| KR | 1020060124036 A | | 12/2006 |
| KR | 10-2007-0097148 A | * | 10/2007 |
| KR | 1020070097148 A | | 10/2007 |

OTHER PUBLICATIONS

Machine translation of KR-10-2007-0097148 A, Park, M., Oct. 4, 2007.*
Machine translation of KR-10-2006-0124036 A, Lee, S., Dec. 5, 2006.*
European Office Action issued on Jul. 8, 2009 in the corresponding European Patent Application No. 08165982.3.

* cited by examiner

*Primary Examiner* — Jonathan Crepeau
*Assistant Examiner* — Kenneth Douyette
(74) *Attorney, Agent, or Firm* — Robert E. Bushnell, Esq.

(57) ABSTRACT

The electrode assembly includes a positive electrode plate and a negative electrode plate, and a film separator interposed between the positive and negative electrode plate to prevent a short circuit. A ceramic layer is formed between the positive electrode collector and the film separator or between the negative electrode coating portion and the film separator.

11 Claims, 3 Drawing Sheets

ELECTRODE ASSEMBLY AND SECONDARY BATTERY HAVING THE SAME

CLAIM OF PRIORITY

This application makes reference to, incorporates the same herein, and claims all benefits accruing under 35 U.S.C. §119 from an application for ELECTRODE ASSEMBLY AND SECONDARY BATTERY HAVING THE SAME earlier filed in the Korean Intellectual Property Office on the 8 Oct. 2007 and there duly assigned Serial No. 10-2007-0101057.

BACKGROUND OF THE INVENTION

1. Field of the Invention

The present invention relates to an electrode assembly and a secondary battery having the same, and more particularly to an electrode assembly to which a ceramic layer is laminated and a secondary battery having the same.

2. Description of the Related Art

Generally, a secondary battery can be used repeatedly when it is charged, which is different characteristics from a primary battery. It serves as a main power of mobile apparatuses for communication, information processing, and audio/video. The main reason that the secondary battery recently comes into the spotlight and makes rapid growth is that it has a high energy density, a high output voltage, a low self-discharge ratio and a long life span, and has ultra light weight and is environmentally friendly.

Secondary batteries are classified into Ni-MH batteries, Li-ion batteries, and the like, based on electrode active materials. Particularly, the Li-ion batteries may be classified based on the type of electrolyte, for example, whether liquid electrolyte is used, or solid electrolyte or gel-type electrolyte is used. And, the secondary batteries are classified into various types, such as a can type, a pouch type, and the like, based on the shape of a can within which the electrode assembly is accommodated.

Since the Li-ion battery has an energy density per weight far superior to that of a primary battery, it is possible to embody an ultra light weight battery using the Li-ion battery. Also, an average voltage per cell of the Li-ion battery is 3.6V, which corresponds to three times of the average voltage of other secondary batteries, such as Ni—Cd battery or Ni-MH battery. Further, since the Li-ion battery has self discharge ratio of less than about 5% per month at 20° C. which is about ⅓ of the Ni—Cd battery or Ni-MH battery and it does not use heavy metal such as Cd or Hg, the battery is environmentally friendly, and can be charged and discharged over 1000 times in a normal condition. Accordingly, due to these advantages, the popularity of secondary battery rapidly grows, and recent progress has been made in the area of information technology.

In a conventional secondary battery, an electrode assembly, which includes a positive electrode plate, a negative electrode plate and a separator, is received in a can formed of aluminum or aluminum alloy. A cap assembly is installed at the top opening of the can, and the can is filled with an electrolyte and sealed, completing a bare cell. If the can is formed of aluminum or aluminum alloy as described above, the secondary battery has advantages that it can become light since aluminum is light in weight, and is prevented from being corroded even when used under high voltage conditions for a long time.

In order to complete a battery pack, the sealed bare cell is inserted in a hard pack, and is connected to a safety means such as positive temperature coefficient (PTC) device, thermal fuse and protective circuit module (PCM), and other battery accessories, or is sealed by using hot melt resin.

Meanwhile, a separator of the battery assembly being formed of an olefin group film prevents two electrodes from being short and the battery from being heated. However, when temperature of the battery suddenly increases due to an external heat transfer or the like, the temperature of the battery continues to increase for a predetermined time although minute through-holes of the separator are closed, so that the separator can be damaged.

Further, if the battery has a high capacity with a high density coating portion so as to have a high density of electrode plate, the electrolyte does not penetrate into the electrode plate, so that electrolyte injection speed of the battery becomes slower or the battery may not have enough electrolyte.

Further, if a large amount of current flows in the secondary battery in a short time period due to the high capacity of the battery, even though the through-holes of the separator are closed, the current cut-off does not decrease the temperature of the battery. Instead, the separator continues to melt by the heat already produced, so that the separator may be damaged, increasing the possibility of internal short circuit.

Accordingly, as it is required that the internal short circuit between electrodes is prevented even at a high temperature, the separator is formed of ceramic layers having porous membrane which are made of particles of the ceramic pillars coupled with thermo-stable binder.

That is, the ceramic layer is more efficient to prevent the internal short circuit, improving safety of the battery, as described above, and is free from being contracted or molten even at internal short-circuit since it is formed on the electrode plate as a coating. Further, the battery has satisfactory and high charging/discharging characteristics because of the use of ceramic powder having a high porosity, and increases an injection speed of the electrolyte since the ceramic powder absorbs the electrolyte rapidly.

As shown in FIG. 8, the conventional electrode assembly, to which the ceramic layer is applied, includes a positive electrode plate 12, a negative electrode plate 22, and a ceramic layer 30 which is formed on the positive electrode or negative electrode plate to prevent the positive electrode and negative electrode plates from being short-circuited and to permit only lithium ions to move therebetween. The positive electrode plate 12 includes a positive electrode collector 10 and a positive electrode coating portion 11 formed on a determined area of the positive electrode collector 10. The negative electrode plate 22 includes a negative electrode collector 20 and a negative electrode coating portion 21 formed on a determined area of the negative electrode collector 20. The positive electrode plate 12, negative electrode plate 22, and the ceramic layer 30 are laminated.

The ceramic layer 30 is uniformly formed on an electrode collector of the positive electrode plate 12 or the negative electrode plate 22 facing each other, and is formed on the electrode coating portion. Accordingly, while improving the stability of the battery by laminating the ceramic layer 30 on the electrode plate in the art, the ceramic layer 30 is laminated on the entire surface except non-coating portions of front and rear sides of the electrode plate where the electrode coating portion is not formed, resulting in decrease of production efficiency due to an increased material cost and the difficulty of quality control.

SUMMARY OF THE INVENTION

Therefore, it is an object of the present invention to provide an electrode assembly and secondary battery having the same, capable of improving the stability of the battery more conveniently and increasing the production efficiency by reducing material cost.

According to an aspect of the present invention, there is provided an electrode assembly including a first electrode plate including a first electrode collector and a first electrode coating portion formed on the first electrode collector, a second electrode plate including a second electrode collector and a second electrode coating portion formed on the second electrode collector, a film separator interposed between the first and the second electrode plates to prevent a short-circuit between the first and the second electrode plates, and a ceramic layer disposed between the first electrode collector and the film separator or between the second electrode coating portion and the film separator.

Preferably, the ceramic layer may be formed laminated on one side portion of the first electrode collector which contacts the film separator.

Preferably, the ceramic layer may be further formed on another side portion of the first electrode collector that is opposite to the one side portion of the first electrode collector and contacts the film separator.

Preferably, a length of the ceramic layer may be less than ⅔ of a length of the first electrode plate.

Preferably, the ceramic layer may be formed on one side portion of the second electrode coating portion contacting the film separator.

Preferably, the ceramic layer may be further formed on another side portion of the second electrode coating portion that is opposite to the one side portion of the second electrode and contacts the film separator.

Preferably, a length of the ceramic layer may be less than ⅔ of a length of the second electrode plate Preferably, the ceramic layer may be formed on a portion of the film separator which contacts the first electrode collector.

Preferably, the ceramic layer may be formed on a portion of the film separator which contacts the second electrode coating portion.

Preferably, the ceramic layer may be formed on a surface of the film separator that faces the first electrode collector, and is formed on another surface of the film separator that faces the second electrode coating portion.

According to another aspect of the present invention, there is provided a secondary battery including an electrode assembly, a can for accommodating the electrode assembly and having an open top, and a cap assembly for sealing the open top of the can. The electrode assembly includes a first electrode plate including a first electrode collector and a first electrode coating portion formed on the first electrode collector, a second electrode plate including a second electrode collector and a second electrode coating portion formed on the second electrode collector, a film separator interposed between the first and the second electrode plates to prevent a short-circuit between the first and the second electrode plates, and a ceramic layer disposed between the first electrode collector and the film separator or between the second electrode coating portion and the film separator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
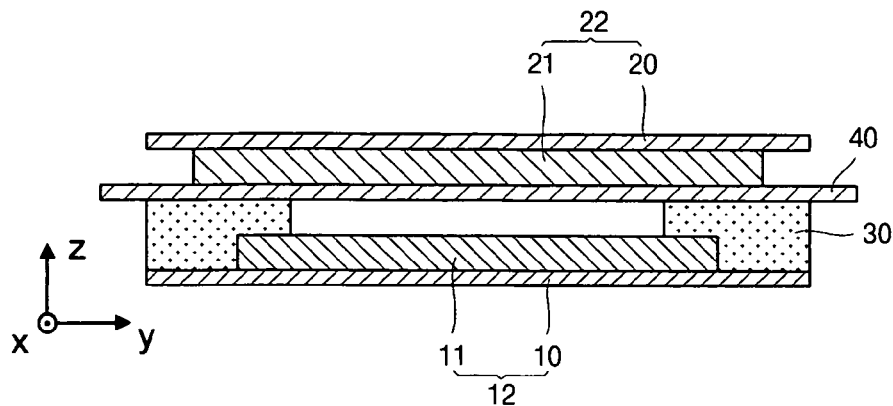
FIGS. 1 to 7 are vertical sectional views of an electrode assembly in accordance with an embodiment of the present invention.

Hereinafter, an exemplary embodiment of an electrode assembly in accordance with the present invention will be described in detail with reference to the accompanying drawings.

An electrode assembly of an exemplary embodiment of the present invention includes a positive electrode plate, a negative electrode plate, a film separator interposed between the positive electrode plate and negative electrode plate to prevent short-circuit between the positive and negative electrode plates and to permit lithium ions to move therebetween, and a ceramic layer interposed between the positive and negative electrode plates. The positive electrode plate, the ceramic layer, the separator, and the negative electrode plate are sequentially laminated forming a stack, and the stack is wound about an edge of the stack.

Each of the positive electrode and negative electrode plates includes a collector made of a metallic foil, and a coating portion formed on the collector. The coating portion is formed by coating the collector with active material slurry. There exists non-coating portion in fore and aft parts of the collector. The positive electrode and negative electrode plates are wound about an edge of one of the fore or aft part of the collector. An electrode tap is installed on the non-coating portion of the collector.

The positive electrode plate has a collector formed of a metal sheet which has an excellent conductivity, for example, aluminum foil, and the coating portion is formed of a positive electrode active material, a conductive material, a binder, and an adhesive agent. The positive electrode active material can be a chalcogenide compound. While the positive electrode active material can be composite metal oxides such as $LiCoO_2$, $LiMn_2O_4$, $LiNiO_2$, and $LiMnO_2$, the present embodiment is not limited to the materials described.

The negative electrode plate has a collector formed of conductive metal sheets such as Cu or Ni foil, and the coating portion is formed of a negative electrode active material, a conductive material, a binder, and an adhesive agent. The negative electrode active material is formed of a carbon-based material, Si, Sn, Tin oxide, composite Tin alloy, transition metal oxide, lithium metal nitride or lithium metal oxide. However, the present embodiment is not limited to the materials listed above.

The binder used in the positive electrode and negative electrode plates is formed of an acrylate-based binder molten in NMP (N-Methyl-2-Pyrrolidone) solvent.

The ceramic layer is formed by coating the positive electrode plate, the negative electrode plate, or the film separator with ceramic paste manufactured by mixing ceramic filler and a binder and a solvent.

The ceramic filler forming the ceramic layer is made of at least one of alumina ($Al_2O_3$), silica ($SiO_2$), zirconium oxide ($ZrO_2$) and titanium oxide ($BaTiO_3$, $TiO_2$). The ceramic filler can have a spherical shape, a dumbbell shape, an oval shape, or an amorphous shape. The particle size of the ceramic filler can be 0.1 μm to 0.7 μm. Furthermore, the thickness of the ceramic layer ranges from 1 μm to 40 μm, preferably, 1 μm to 30 μm, and pore size ranges from 40 nm to 200 nm.

Generally, the binder used in the ceramic layer is a polymer resin, which may be formed of a polymer of acrylate or methacrylate which is an acrylate rubber-based material or a copolymer thereof, standing against heat of 200° C. Further, it is preferable that a small quantity of the binder is used in slurry for forming a porous membrane. In other word, the mixing ratio of the ceramic filler to binder in the porous membrane ranges from 98:2 to 85:15 based on mass. Within this range of the ratio, the ceramic filler can be prevented from being completely covered by the binder. That is, if the binder covers the ceramic filler, the transfer of the ion will be limited, and therefore, the binder is prevented from covering the ceramic filler.

The ceramic layer has high stability over the internal short circuit since the ceramic powder and the binder have decomposition temperatures higher than 500° C. and 250° C., respectively. Further, the ceramic paste is free from shrinking or melting since it adheres to the electrode plate or film separator as a coating. Accordingly, only a small damage occurs even in the case of an internal short circuit, and there is no shrinking or melting in the ceramic layer. Therefore, the short-circuited part does not extend. Furthermore, if the battery is over-charged, over charged current is consumed by generating a short circuit so that the voltage is kept constant at 5 V to 6 V, and the temperature is kept less than 100° C., improving stability against over charge.

Furthermore, since the ceramic powder has a high void ratio, the electrolyte is absorbed quickly, and accordingly the injection speed of the electrolyte is improved. Also, since the electrolyte holding property is very well, the battery life span and the high battery discharge ratio property are improved.

Generally, if the temperature of the battery suddenly increases due to an external heat transfer or the like, or a large amount of current flows in the secondary battery in a short time period because of the high capacity of the battery, the film separator is damaged, so that there is a high possibility of the internal short circuit.

Battery fire occurs when there is an internal short circuit in a charged battery. Table 1 shows possible occurrences in the cases of internal short circuits between the coating portions and collectors of opposite electrode plates.

TABLE 1

|  |  | Positive electrode plate | |
| --- | --- | --- | --- |
|  |  | Positive electrode coating portion | Positive electrode collector (Aluminum foil) |
| Negative electrode plate | Negative electrode coating portion | No reaction (small amount of heat generation) | Fire |
|  | Negative electrode collector (Copper foil) | No reaction (small amount of heat generation) | Spark |

When an positive electrode coating portion of the positive electrode plate contacts a negative electrode coating portion or a negative electrode collector of the negative electrode plate, resistance increases to 1 kO or higher, and current flow decreases, so that there is no reaction or a small amount of heat is generated in the battery. When the positive electrode collector of the positive electrode plate contacts the negative electrode collector of the negative electrode plate, resistance is at the level of 1 mO, and accordingly a spark but no fire occurs in the battery. Furthermore, when the positive electrode collector of the positive electrode plate contacts the negative electrode coating portion of the negative electrode plate, resistance is at the level of 1 O, and accordingly fire can occur in the battery.

That is, fatal fire occurs when the positive electrode collector contacts the negative electrode coating portion. The results shown in Table 1 show that the internal short circuit, through which a large amount of current flows, can be prevented by forming the ceramic layer only on a portion of the positive electrode collector.

Referring to FIGS. 1 through 7, the electrode assembly in accordance with an embodiment of the present invention includes a positive electrode plate 12, a negative electrode plate 22, a film separator 40 interposed between the positive electrode plate 12 and negative electrode plate 22, and a ceramic layer 30. The film separator 40 prevents a short-circuit between the positive and negative electrode plate 12 and 22. The positive electrode plate 12 includes a positive collector 10 and a positive electrode coating portion 11, and the negative electrode plate includes a negative collector 20 and a negative electrode coating portion 21. The positive and negative electrode plates can be referred to a first and second electrode plates, respectively, and vice versa. In other words, the negative electrode plate can be a first electrode plate, and the positive electrode plate can be a second electrode plate. The ceramic layer 30 is disposed between the film separator 40 and the positive electrode collector 10 or between the film separator 40 and the negative electrode coating portion 21. The positive electrode plate 12, the ceramic layer 30, the film separator 40, and the negative electrode plate 22 are sequentially laminated forming a stack, and the stack is wound about an edge of a fore or aft part of the stack. In other words, the stack is wound about x-axis shown in FIG. 1, which is pointing out of the paper.

The film separator 40 can be formed of polyethylene PE or polypropylene PP resin or a general insulating tape. Further, the width of the film separator 40 is wider than that of the positive electrode and negative electrode plates, so that short circuit between electrode plates can be prevented. Herein the width is defined as a distance along x-axis shown in FIG. 1, while a length is defined as a distance along y-axis.

Figure 2:
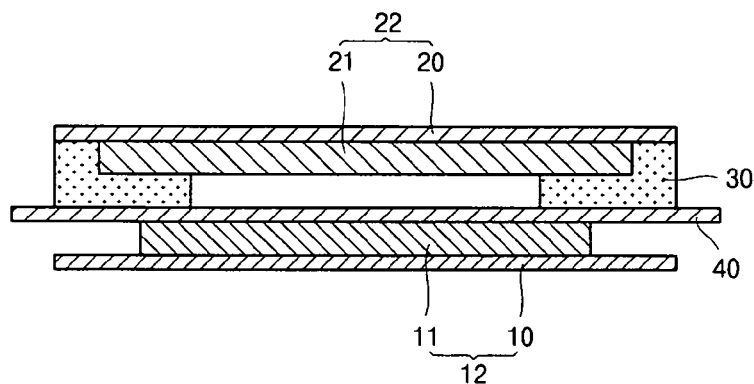

The ceramic layer 30 can be laminated on a side portion of the positive electrode collector 10 as shown in FIG. 1 that illustrates one embodiment of the present invention. Without the ceramic layer 30, the side portion formed around an edge of the positive electrode collector 10 may contact the film separator 40. The ceramic layer 30 is formed between the side portion of the positive electrode collector 10 and the film separator 40, and prevents the contact between the positive electrode collector 10 and the film separator 40. The ceramic layer 30 can be laminated on a side portion of the negative electrode coating portion 21 of the negative electrode plate as shown in FIG. 2 illustrating another embodiment of the present invention.

Figure 3:
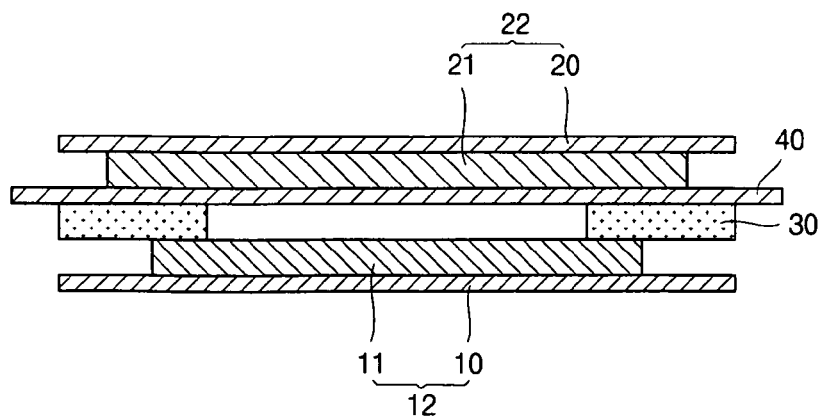
Figure 4:
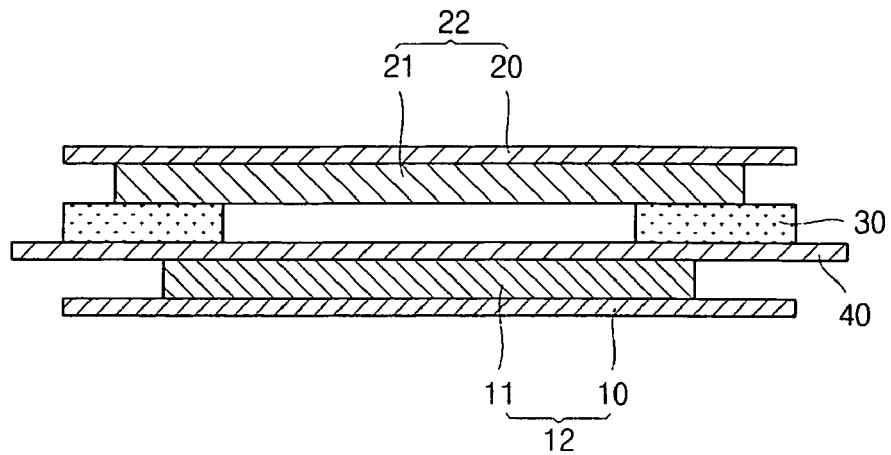

Further, the ceramic layer 30 can be laminated on a side portion of the film separator 40 contacting the positive electrode collector 10 as shown in FIG. 3 illustrating yet another embodiment of the present invention, and it can be laminated on the side of the film separator 40 contacting the negative electrode coating portion 21 of the negative electrode plate facing the positive electrode collector 10 as shown in FIG. 4 illustrating yet another embodiment of the present invention. The side portion of the film separator 40 means a portion around an edge of the film separator, but may not include the edge as shown in FIGS. 3 and 4. But the ceramic layer can extend toward the edge to include the edge of the film separator 40. In the structure shown in FIG. 3, the ceramic layer is formed on a lower surface of the film separator 40, and in the structure shown in FIG. 4, the ceramic layer 30 is formed on an upper surface of the film separator 40.

Further, the ceramic layer 30 can be formed on a surface and the opposite surface of the positive electrode collector 10, one of which contacts the film separator 40. That is, the ceramic layer 30 can be formed on both surfaces of the positive electrode collector 10 as shown in FIG. 5 illustrating yet another embodiment of the present invention.

Figure 6:
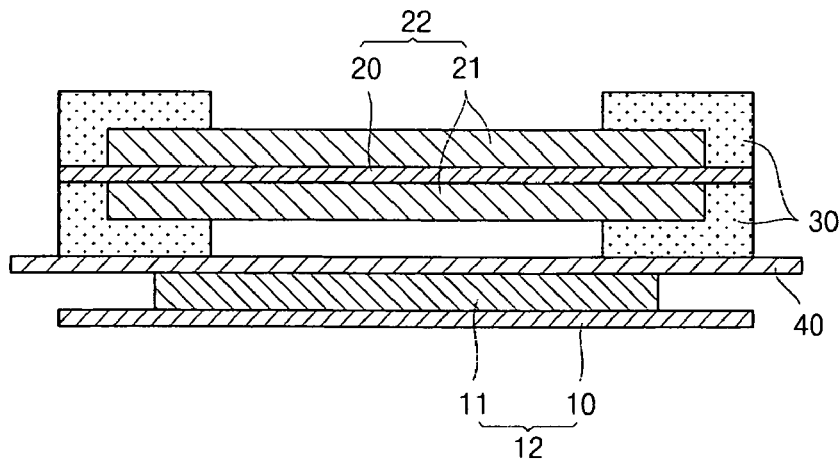

Further, the ceramic layer 30 can be formed on a surface and the opposite surface of the negative electrode coating portion 21 of the negative electrode plate. That is, the ceramic layer 30 is formed on both surfaces of the negative electrode coating portion 21 as shown in FIG. 6 illustrating yet another embodiment to the present invention.

Figure 5:
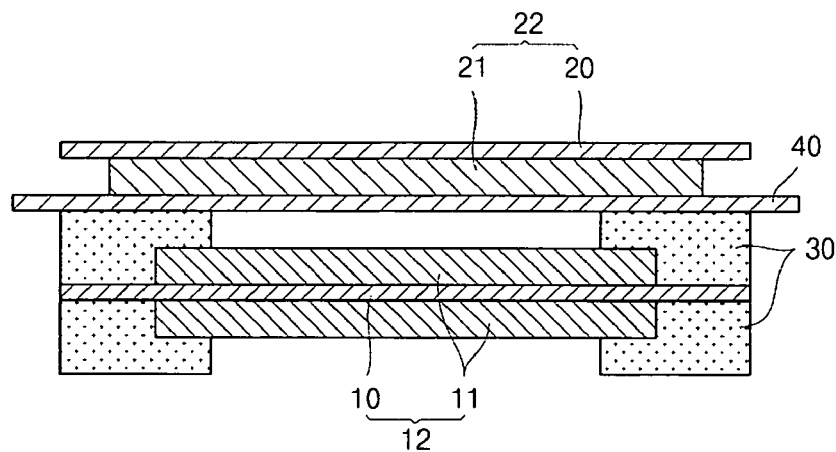

At this time, a length of the ceramic layer 30 can be less than two thirds (⅔) of the length of the positive electrode plate as shown in FIGS. 1 and 5, and less than two thirds (⅔) of the length of the negative electrode plate as shown in FIGS. 2 to 6. Herein, the length is defined as a distance along y-axis shown in FIG. 1. If the ceramic layer 30 is formed on both side portions of the positive electrode collector 10 or the negative electrode coating portion 21, the length of the ceramic layer 30 means a total length of the ceramic layers. In other word, the total length of the ceramic layers 30 can be less than two thirds (⅔) of the length of the positive electrode plate or the negative electrode plate. In this case, because the ceramic layer 30 is shorter than the positive electrode plate or the negative electrode plate, an empty space may be formed between the two ceramic layers, each of which is formed at one of the side portions of the positive electrode collector 10 or the negative electrode coating portion 21.

Figure 7:
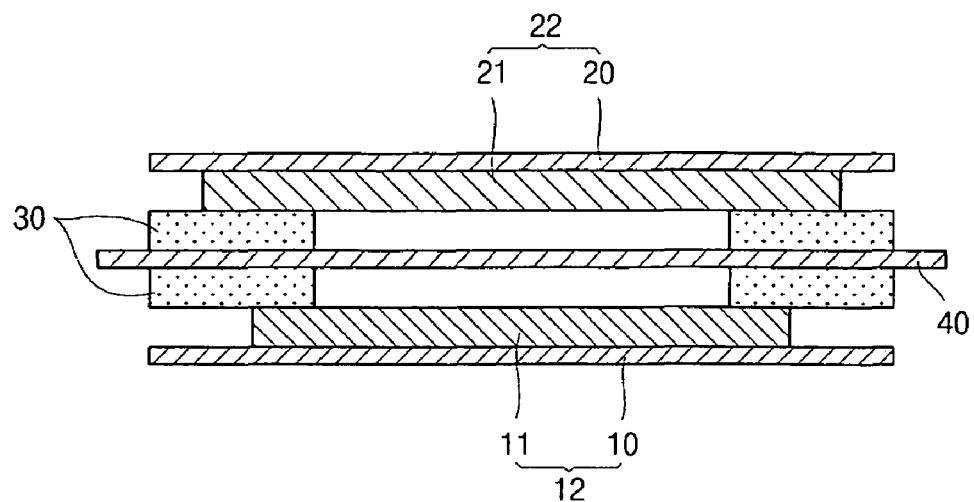
Figure 8:
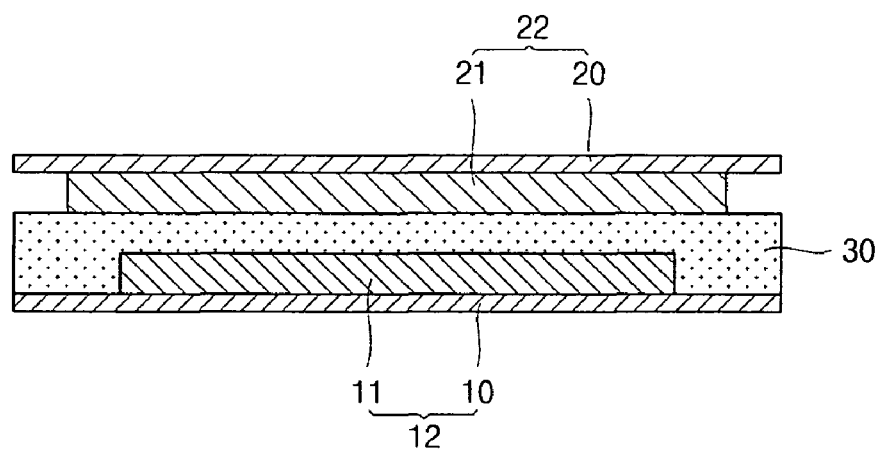
FIG. 8 is a vertical sectional view of a contemporary electrode assembly.

Furthermore, the ceramic layer 30 can be formed on both of a lower surface of the film separator 40 contacting the positive electrode collector 10 and an upper surface of the film separator 40 contacting the negative electrode coating portion 21 of the negative electrode plate. In other words, the ceramic layer 30 can be laminated on both surfaces of the film separator 40 as shown in FIG. 7.

An embodiment of the secondary battery including the battery assembly in accordance with an embodiment of the present invention will be described in detail.

An embodiment of the secondary battery including the electrode assembly in accordance with an embodiment of the present invention includes an electrode assembly, a can receiving the electrode assembly, and a cap assembly for sealing an open top of the can.

The electrode assembly has the ceramic layer which can be laminated on two sides with which the positive electrode collector of the positive electrode plate and the film separator are contacted or on one side of two sides with which the negative electrode coating portion of the negative electrode plate facing the positive electrode collector and the film separator are contacted.

At this time, the ceramic layer can be laminated on one side of the positive electrode collector 10 contacting the film separator 40 or one side of the negative electrode coating portion 21 of the negative electrode plate facing the positive electrode collector 10 as shown in FIGS. 1 and 2.

Further, the ceramic layer can be laminated on one side of the film separator 40 contacting the positive electrode collector 10 or one side of the film separator 40 contacting the negative electrode coating portion 21 of the negative electrode plate facing the positive electrode collector 10 as shown in FIGS. 3 and 4.

The can and cap assembly are formed of a general construction of a secondary battery.

That is, the can roughly has a rectangular shape, which is formed of aluminum or aluminum alloy. The can receives the electrode assembly through an open top thereof and serves as a container of the electrode assembly and an electrolyte. The can itself serves as a terminal.

The cap assembly is equipped with a planar cap plate whose size and shape correspond to those of an open top of the can. At this time, a tube-shaped gasket for electrical insulation is installed between the electrode terminal passing through the center of the cap plate and the cap plate. Further, an insulating plate is arranged on a lower side of the cap plate and a terminal plate is installed under the insulating plate. Further, the lower side of the electrode terminal is electrically connected to the terminal plate. A positive electrode tap extended from the positive electrode plate is welded to the lower side of the cap plate, and a negative electrode tap extended from the negative electrode plate is welded to the lower side of the electrode terminal under the state that the negative electrode tap has a bent part in a zigzag shape.

An electrolyte injection hole is formed at one side of the cap plate, and a stopper is formed to seal the electrolyte injection hole after the electrolyte is injected. The stopper is formed by placing and pressing ball type basic material of aluminum or aluminum containing metal on the electrolyte injection hole. The stopper used for sealing the battery is welded to the cap plate around the electrolyte injection hole. The cap assembly is welded to the can by welding a cap plate vicinity to a side wall of the can opening.

Hereinafter, an operation of an electrode assembly and a secondary battery having the same in accordance with an embodiment of the present invention will be described.

In order to manufacture the electrolyte assembly in accordance with an embodiment of the present invention, first, an electrode coating portion is formed on the electrode collector by coating active material slurry on the electrode collector. It is preferable that the electrode coating portion is formed of an acrylate-based binder dissolved in NMP (N-Methyl-2-Pyrrolidone) solvent. Meanwhile, while the electrode collector has non-coating portions at fore and aft parts of the electrode collector, the positive electrode and negative electrode plates are manufactured by attaching the positive electrode and negative electrode taps to some parts of the non-coating portions, respectively.

Subsequently, as shown in FIGS. 1 to 4, the film separator 40 to prevent the both electrodes from being short circuited is interposed between the positive electrode plate and the negative electrode plate, and the ceramic layer 30 can be laminated on one side of the positive electrode collector 10 contacting the film separator 40, one side of the negative electrode coating portion 21 of the negative electrode plate facing the positive electrode collector 10, one side of the film separator 40 contacting the positive electrode collector 10, or one side of the film separator 40 contacting the negative electrode coating portion 21 of the negative electrode plate facing the positive electrode collector 10.

Different from the conventional way that the ceramic layer is formed on any one side which a positive electrode plate and negative electrode plate contacts or uniformly formed on every side of the positive electrode plate and the negative electrode plate, the ceramic layer according to the present invention is laminated on at least one side of sides which the positive electrode collector and the negative electrode coating portion, both inducing fatal battery fire, contact, so it is possible to guarantee battery stability more conveniently and accordingly increase production efficiency due to the reduction of material cost.

As described above, according to the present invention, the ceramic layer is laminated on at least one side of sides with which the positive electrode collector and the negative electrode coating portion are contacted, so it is possible to guarantee battery stability more conveniently and accordingly increase production efficiency due to the reduction of material cost.

Although the exemplary embodiments of the invention have been described above, the invention is not limited thereto. Therefore, it would be appreciated by those skilled in the art that various modifications and changes of the invention can be made without departing from the scope and spirit of the invention, the scope of which is defined in the appended claims and their equivalents.

What is claimed is:

1. An electrode assembly comprising:
    a first electrode plate including a first electrode collector and a first electrode coating portion formed on the first electrode collector;
    a second electrode plate including a second electrode collector and a second electrode coating portion formed on the second electrode collector;
    a film separator interposed between the first and the second electrode plates, the film separator preventing short-circuit between the first and the second electrode plates; and
    a ceramic layer disposed between the first electrode collector and the film separator or between the second electrode coating portion and the film separator, a length of the ceramic layer being less than two thirds of a length of the first electrode plate.

2. The electrode assembly according to claim 1, wherein the ceramic layer is formed on one side portion of the first electrode collector, the ceramic layer contacting the film separator.

3. The electrode assembly according to claim 2, wherein the ceramic layer is formed on another side portion of the first electrode collector that is opposite to the one side portion of the first electrode collector and contacts the film separator.

4. The electrode assembly according to claim 1, wherein the ceramic layer is formed on one side portion of the second electrode coating portion, the ceramic layer contacting the film separator.

5. The electrode assembly according to claim 4, wherein the ceramic layer is formed on another side portion of the second electrode coating portion that is opposite to the one side portion of the second electrode coating portion and contacts the film separator.

6. The electrode assembly according to claim 4, wherein a length of the ceramic layer is less than two thirds of a length of the second electrode plate.

7. The electrode assembly according to claim 1, wherein the ceramic layer is formed on a portion of the film separator that contacts the first electrode collector.

8. The electrode assembly according to claim 1, wherein the ceramic layer is formed on a portion of the film separator that contacts the second electrode coating portion.

9. The electrode assembly according to claim 1, wherein the ceramic layer is formed on a surface of the film separator that faces the first electrode collector, and is formed on another surface of the film separator that faces the second electrode coating portion.

10. The electrode assembly according to claim 1, wherein the ceramic layer is disposed between the first electrode collector and the film separator and between the second electrode coating portion and the film separator.

11. A secondary battery comprising:
    an electrode assembly of claim 1;
    a can for accommodating the electrode assembly, the can having an open top; and
    a cap assembly for sealing the open top of the can.

* * * * *